Dec. 29, 1925.  
M. STILL  
JAW TRAP  
Filed June 16, 1925  
1,568,004  
2 Sheets-Sheet 1

Milan Still,
Inventor

Dec. 29, 1925.  
M. STILL  
JAW TRAP  
Filed June 16, 1925  
1,568,004  
2 Sheets-Sheet 2

Milan Still, Inventor

Patented Dec. 29, 1925.

1,568,004

UNITED STATES PATENT OFFICE.

MILAN STILL, OF KODIAK, TERRITORY OF ALASKA.

JAW TRAP.

Application filed June 16, 1925. Serial No. 37,530.

*To all whom it may concern:*

Be it known that I, MILAN STILL, a citizen of the United States, residing at Kodiak, Third Judicial Division, Territory of Alaska, have invented certain new and useful Improvements in Jaw Traps, of which the following is a specification.

This invention relates to animal traps, and has more particular reference to an improvement in jaw traps generally employed in trapping of large animals.

The primary object of the present invention is to generally simplify an improved animal trap of the above kind so that the same may meet with all of the requirements for a successful commercial use.

A further object of my invention is to substitute simpler, fewer, stronger, lighter, cheaper and more efficient parts for numerous weak parts of which traps now in use are constructed.

Another object is to provide a jaw trap which is extremely simple and durable in construction as well as efficient in operation.

Jaw traps now in common use embody pivotally connected U-shaped jaws and actuating springs for closing the jaws which project laterally from opposite sides of the trap and must be carefully covered when the trap is set, a time consuming and undesirable operation.

A still further object of the invention, therefore, is to provide a jaw trap in which these laterally projecting springs are eliminated so that the operation of covering the same is avoided.

Another object of the invention is to provide improved and more reliable means for maintaining the jaws in set position and for releasing the same from set position.

Still another object of the invention is to so construct the trap as to insure effective gripping engagement of jaws with the animal when swung to closed position.

With the above general objects in view, and others that will become apparent as the nature of the invention is better understood, the same consists in the novel form, combination and arrangement of parts hereinafter more fully described, shown in the accompanying drawings and claimed.

Figure 1:
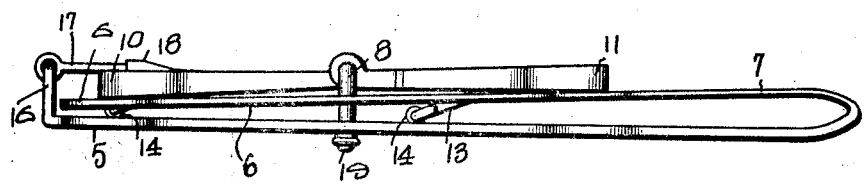
Figure 2:
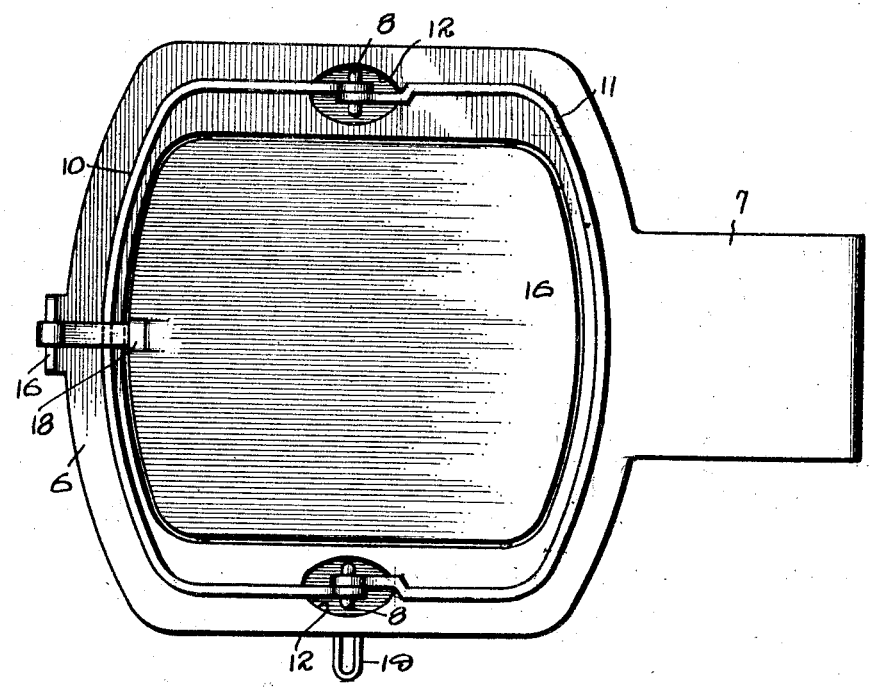
Figure 3:
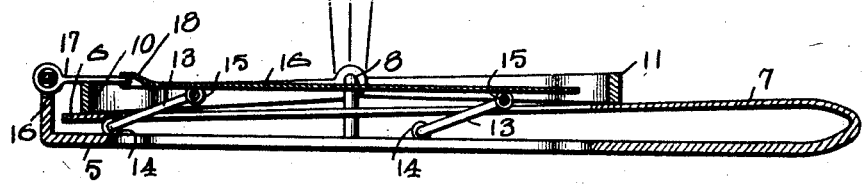
Figure 4:
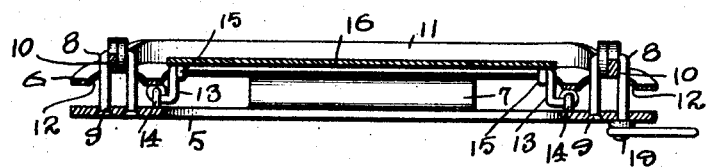
Figure 5:
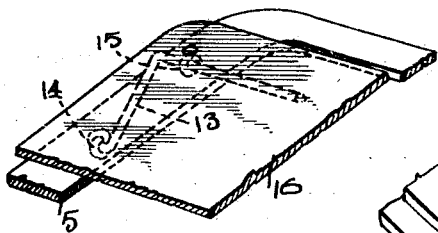
Figure 6:
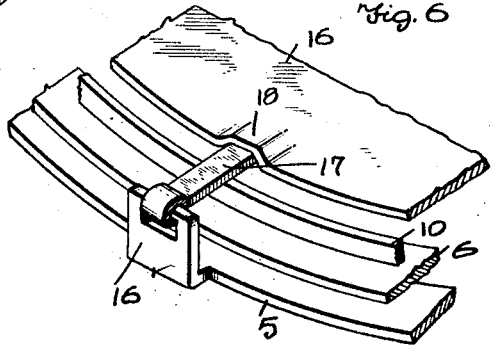

In the drawings, wherein like reference characters indicate corresponding parts throughout the several views, Figure 1 is a side elevational view of a jaw trap constructed in accordance with the present invention with its jaws in set position, Figure 2 is a top plan view of the device shown in Figure 1, Figure 3 is a substantially central longitudinal sectional view of the trap shown in Figures 1 and 2, Figure 4 is a transverse sectional view taken on a line intersecting the pivotal connections between the adjacent pivoted ends of the jaws, Figure 5 is a fragmentary perspective view illustrating a detail of the trap, and Figure 6 is a view similar to Figure 5 illustrating a further detail.

Referring more in detail to the drawings, the present trap embodies a pair of superimposed substantially ring shaped plates 5 and 6, the adjacent ends of which at one end of the trap are respectively rigid with the ends of a relatively narrower and short centrally disposed return bent sheet metal spring member 7 by means of which the upper ring shaped plate 6 is normally urged upwardly and away from the base ring or plate 5 for closing the jaws of the trap in a manner which will presently become apparent. As shown, the ring shaped plates 5 and 6 and the spring member 7 are preferably formed integrally or from a single sheet of metal, one end portion of which is formed of lesser thickness than the other portion thereof whereby the lower arm of the spring member 7 and the base plate or ring 5 are made relatively thicker and rigid, so that the upper arm of the spring member 7 and the upper ring 6 will swing upwardly when the trap is placed in operation upon the ground, in a most desirable manner.

Staples 8 are disposed centrally of the side portions of the base ring 5 so as to project upwardly from the latter, the lower ends of the arms of said staples being riveted in openings provided in the base plate 5 as indicated at 9 and shown clearly in Figure 4. The upper intermediate portions of the staples 8 are thus horizontally disposed transversely of the trap, and pivoted to freely swing upon these central portions of the staples are the adjacent ends of a pair of vertically swinging U-shaped jaws 10 and 11.

The jaws 10 and 11 are formed of such size that when the same are separated and swung downwardly, they will overlie the upper ring 6 as clearly shown in the several views. Furthermore, these jaws taper so as to increase in width gradually from the pivotally mounted ends thereof so that when the intermediate portions of the jaws engage the adjacent portions of the upper ring member 6, the narrower portions of the jaws adjacent to the staples 8, will be spaced from the upper ring 6 as clearly shown in Fig. 1, whereby the initial upward swinging movement of the jaws 10 and 11 is effected by force exerted upon the outer intermediate portions of the jaws. The upper ring member 6 is formed with side openings 12 preferably of oval or elongated form as clearly shown in Figure 2 and through which the staples 8 project upwardly when the trap is in set condition. It will thus be seen that upon upward movement of the upper ring 6 the jaws 10 and 11 will be swung upwardly until the walls of the opening 12 engage the edges of the jaws 10 and 11 outwardly or upwardly of the pivoted ends of the jaws for completing the closing movement of the latter. By reason of the tapered shape of the jaws the walls of the openings 12 will have a wedging action thereon so that effective closing of the jaws and retention of the same closed is insured.

The horizontal outwardly projecting end portions of a pair of transversely disposed spaced crank members or bails 13 are pivoted in eyes 14 which are secured to and project upwardly from the side portions of the base ring 5 as clearly shown in several of the views, and the horizontal intermediate portions of these bails or cranks 13 are freely rotatable in depending pairs of eyes 15 secured to a centrally disposed trip platform or plate 16 which is of a size to substantially cover the opening in the upper ring member 6. Projecting upwardly from the central portion of the forward end of the base ring 5 or from the end of the latter opposite that to which the spring member 7 is connected, is an ear 17 to the upper end of which is hinged a trigger arm 17. The trigger arm 17 is thus mounted for vertical swinging movement and the trip plate or platform 16 is mounted for forward and upward movement as well as rearward and downward movement. The platform or trip plate 16 is formed centrally of its forward edge with an upwardly pressed portion 18 that forms a groove on the under side of the plate or platform 16 extending longitudinally of the latter and coincident with the trigger arm 17.

In use, the jaws 10 and 11 are separated and swung downwardly to the full line position of Figure 3, whereupon the trigger arm 17 is swung downwardly and inwardly so as to extend across the edge of the adjacent jaw 10 which is uppermost, the jaws being then resting at their outer or intermediate portions upon the upper ring member 6 as shown. When thus positioned the trigger arm 17 is horizontally disposed and projects inwardly past the intermediate portion of the jaw 10. The platform or plate 16 is then swung upwardly and forwardly so that the free inner end of the trigger arm 17 engages in the groove formed by the offset portion 17 of the platform or plate 16. The platform or plate 16 normally tends to lower by gravity but the frictional engagement between the trigger arm 17 and the platform prevents this so that the jaws are retained in set position. Accidental release of the trigger arm 17 from the platform 16 is also prevented due to the fact that the upward swinging or release movement of the trigger arm 17 tends to cause upward and forward swinging movement of the platform or plate 16 which would result in better engagement of the platform with the trigger arm 17.

Prior traps of this character usually embody jaw tripping devices which are relatively small and leave the major portion of the opening in the upper ring 6 open or exposed. This necessitates filling in the exposed portion of the opening, an undesirable and time consuming operation, and in order to release the jaws the animal must engage a member which is relatively small. By the use of the platform 16 the filling in of the opening of the upper ring member 6 is rendered unnecessary and release of the jaws is insured when the platform 16 is engaged and depressed at any portion of the latter. However, the platform or plate 16 is entirely within the confines of the jaws 10 and 11 when lowered or in set position so that a portion of the animal must be within the area bounded by the jaws when set before said jaws will be released so that trapping of the animal is insured.

If desired, one leg of one of the staples 8 may be extended below the base ring 5 to permit the attachment of an end link of an anchor chain thereto as generally indicated at 19 in Figures 1 and 4. As is well known in the art, these anchor chains are employed for preventing the traps from being carired away by the animal.

Prior jaw traps embody a bottom frame composed of two parts weakly riveted together, but in the present invention the same are dispensed with by substituting the stronger base ring 5 as an integral extension from the lower arm of the single spring member 7. Further, the rings 5 and 6 and spring member 7 constitute a one-piece spring device by means of which the use of the two long and cumbersome springs provided at the sides of prior jaw traps, is eliminated. It will also be seen that the present trap, when set, is quite flat so that the trap may be placed ready for operation with comparatively little disturbance of earth, the spring member 7 and other parts being concealed by the same material which is used to conceal the jaws.

As substantially the entire space between the jaws, when set, is filled by the trip plate 16, the material used to cover and conceal the trap cannot get under said plate for preventing it from being depressed and thereby preventing the jaws from being released, a common occurrence with traps now in common use.

The trip plate 16, being entirely and directly supported upon the inclined cranks 13, is maintained parallel with the base ring 5 at all times and is quite sensitive in operation or readily depressible or releasable when pressure is applied on the same by the animal, whereby springing of the trap is insured. The trip plate 16, being quite large, insures trapping of a greater number of animals than is had by the use of prior trap embodying relatively small trip members.

The trip plate 16 and its supporting cranks 13 also provides a very strong and durable construction, and the trip plate is not pushed upwardly by the spring so as to help the animal to extricate itself as is the case with prior traps.

From the foregoing description it is believed that the construction and operation as well as the advantages of the present invention will be readily understood and appreciated by those skilled in the art.

Minor changes may be made without departing from the spirit and scope of the invention, as claimed.

What I claim as new is:

1. In a jaw trap, a base member, a ring-shaped member disposed above the base member, a U-shaped spring member having its ends rigid with adjacent ends of said ring-shaped member and the base member at one end of the trap and tensioned to cause case movement of the ring-shaped member upwardly away from the base member, said ring shaped member having vertical openings in the side portions thereof, pivot members rigid with and projecting upwardly from the side portions of the base member so as to pass through said vertical openings of the ring shaped member when the latter is lowered and the spring member placed under tension, a pair of U-shaped jaws disposed transversely of the spring member and having adjacent ends hinged to the upper portions of said pivot members so that the jaws may swing vertically, and trip-controlled means for retaining the jaws in separated downwardly swung position in engagement with the upper ring-shaped member and for retaining the latter lowered with the spring member under tension.

2. In a jaw trap, a pair of spaced superimposed substantially ring-shaped members, a U-shaped spring member having its ends rigid with adjacent ends of said ring-shaped members at the end of the trap and tensioned to cause movement of the upper ring-shaped member upwardly away from the lower ring-shaped member, said upper ring shaped member having vertical openings in the side portions thereof, pivot members rigid with and projecting upwardly from the side portions of the lower ring-shaped members so as to pass through said vertical openings when the upper ring-shaped member is lowered and the spring member placed under tension, a pair of U-shaped jaws having adjacent ends hinged to the upper portions of said pivot members so that the jaws may swing vertically, and trip-controlled means for retaining the jaws in separated downwardly swung position in engagement with the upper ring-shaped member and for retaining the latter lowered with the spring member under tension, the arms of said jaws gradually tapering narrower in width from the outer to inner pivoted ends thereof, whereby only the outer portions of the jaws contact the upper ring-shaped member when in set position and whereby a wedging action is had for closing the jaws and retaining them closed when released.

3. In a jaw trap, a base member, a spring raised jaw closing member of substantially ring shape mounted above the base member, jaws hinged to the base member, a trip plate substantially covering the opening of the jaw-closing member, and a trigger arm carried by the base member adapted to engage the trip plate to retain the jaws in separated and lowered set position, and means to cause movement of the trip plate bodily downwardly and away from the trigger arm upon depression of said trip plate.

4. In a jaw trap, a base member, a spring raised jaw closing member of substantially ring shape mounted above the base member, jaws hinged to the base member, a trip plate substantially covering the opening of the jaw-closing member and movably mounted on the base member, and a trigger arm carried by the base member and adapted to engage the trip plate to retain the jaws in separated and lowered set position, the means for mounting the trip plate on the base member embodying inclined crank members having their ends pivoted on the base member and their intermediate portions hinged to the underside of the trip plate whereby the latter may be moved downwardly and away from the trigger arm for releasing the jaws.

5. In a jaw trap, a base member, a spring raised jaw closing member mounted above the base member, jaws hinged to the base member, a trip plate movably mounted on the base member, and a trigger arm carried by the base member and adapted to engage the trip plate to retain the jaws in separated and lowered set position, the means for mounting the trip plate on the base member embodying inclined crank members having their ends pivoted on the base member and their intermediate portions hinged to the under side of the trip plate whereby the latter may be moved downwardly and away from the trigger arm for releasing the jaws.

In testimony whereof I affix my signature.

MILAN STILL.